Jan. 21, 1969     P. G. McGOWAN ET AL     3,422,679
ASEPTIC PRESSURE AND/OR VACUUM MEASURING DEVICE
Original Filed Sept. 28, 1965
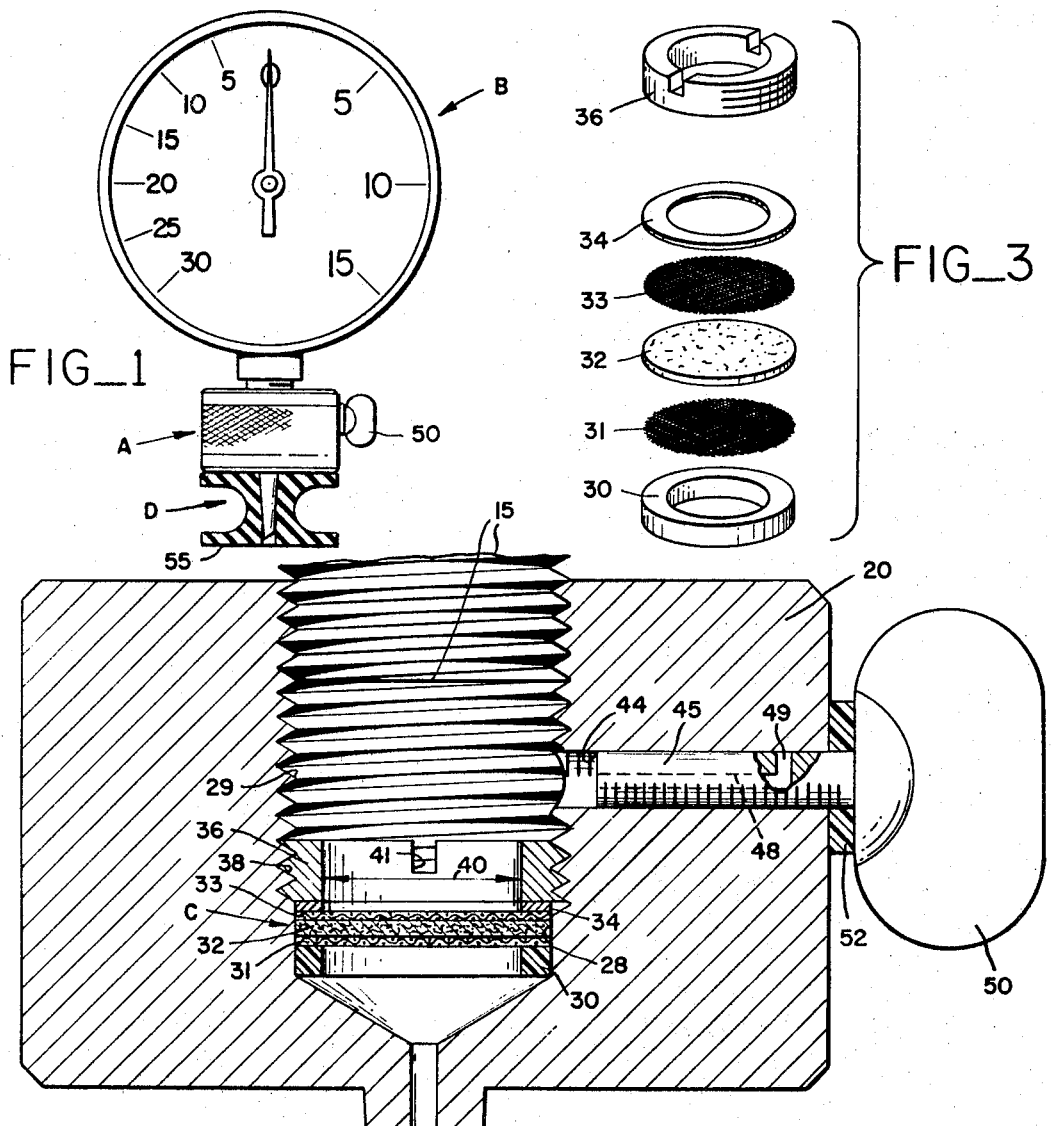
INVENTOR.
PATRICK G. McGOWAN
BY ROBERT E. MAUGER
*Townsend and Townsend*
ATTORNEYS

United States Patent Office 3,422,679
Patented Jan. 21, 1969

3,422,679
ASEPTIC PRESSURE AND/OR VACUUM MEASURING DEVICE
Patrick G. McGowan, and Robert E. Mauger, Fremont, Mich., assignors to Gerber Products Company, Fremont Mich.
Continuation of application Ser. No. 490,904, Sept. 28, 1965. This application Dec. 13, 1967, Ser. No. 690,360
U.S. Cl. 73—395                     1 Claim
Int. Cl. G01l 7/00

ABSTRACT OF THE DISCLOSURE

A vacuum-measuring assembly for use in combination with a gas pressure gauge having an externally threaded inlet fitting to obtain an indication of the vacuum within an aseptically-sealed container. The assembly includes a housing having a hollow, needle-shaped member for piercing a wall of the container, the needle-shaped member including a bore of sufficient cross section to allow for gas flow therethrough. Various elements are provided to allow for aseptic release of the vacuum prior to removal of the device from the container and also to prevent leakage and contamination of the container contents.

---

This application is a continuation of U.S. patent application Ser. No. 490,904, filed Sept. 28, 1965, now abandoned.

This invention relates to a filter mechanism for use in conjunction with a pressure and/or vacuum gauge to isolate the area from which the pressure sample is taken from the pressure gauge assembly.

In various industrial food and medical applications it is necessary to sample the pressure within containers without injecting contamination, either bacteria or foreign matter, into the container during the sampling operation. It is evident, particularly in sampling vacuum or negative pressures, that in order to effect a sampling, air or gas is drawn from the measuring apparatus into the container. It is the principal object of this invention to provide an adaptor which fits between a vacuum gauge and the container which will adequately filter the air entering the container of all harmful contaminants without impairing the accuracy of the measurement.

A further object of this invention is to provide a valve mechanism in association with the testing filter to allow air to pass from atmosphere into the sample container through the filter to allow the vacuum within the container to be released without the introduction of contaminating elements.

A further object of this invention is to provide a filter attachment which can readily be disassembled for sterilizing and replacement of filters.

A feature and advantage of this invention lies in the fact that new filters can be installed for each testing sample to avoid possible contamination by collection of contaminants within the filter itself.

A feature and advantage of the filter mechanism is due to the fact that the filter is easily replaceable, so that the filter may be formed of material which will allow a relatively rapid air flow because saturation requirements of the filter need not be large, thus, it can be seen that relatively high porosity filters may be employed without impairing the sterility function.

Another object of the invention is to provide a filter for use in filtering air flow from a sample container in which a cellulose membrane filter of suitable porosity is positioned between two support screens which function to support the thin filter and also add blockage of large bits of matter.

Another object of this invention is to provide a columnar attachment for connection to a pressure indicating device in which the column contains a filter held in position by a threaded cap to lock the filter in place within the column and in which the threads for the cap form the bore of the column, and which further incorporates a vent valve opening to the column between the gauge and the filter.

Other objects, features, and advantages of the present invention will be more apparent after referring to the following specification and attached drawings in which:

FIG. 1 is a top plan view showing a pressure meter with a filter attachment of this invention attached thereto.

FIG. 2 is an enlarged cross-sectional view of the filter attachment; and

FIG. 3 is an exploded view showing the various components forming the filtering and structural elements of the filter attachment.

The filter attachment A of the present invention is arranged to attach to the input of a meter B. The input of meter B is formed of a threaded shaft 15 with the threads located on the exterior of the shaft and the input to the meter being within a bore leading through the shaft. Such meters are common commercial products and vary in sensitivity and range with requirements.

The filter attachment A is composed of a housing 20 having at the bottom a needle 22 in which the point 23 of the needle is arranged to puncture the wall of the container to be sampled. Entering transversely of the needle is formed an entrant bore 24 opening to the filter of needle 22 and thence upwardly into the main body of housing 20 through a bore section 25 which is axially aligned with the body of the needle. Bore section 25 within housing 20 widens to form an enlarged filter receiving bore area 28 which is formed with a smooth cylindrical wall. Over the filter receiving area, the wall is threaded at 29 with threads adapted to receive at the upper end of housing 20 the input shaft 15 of meter B. Thus, with the meter attached within threads 29, a fluid passageway from entrant bore 24 will exist through bore section 25 and the enlarged filter receiving bore area 28 to the meter.

The filter assembly generally indicated at C is mounted within the filter receiving bore area 28. The filter assembly comprises a Teflon washer 30 having an outer diameter equaling the bore of filter receiving bore area 28 and an inside diameter sufficient to allow the desired air passageway through the filter. Overlying the Teflon washer 30 is a support screen 31 having an outer diameter equal to the washer. On top of the screen is placed a cellulose membrane filter 32 having an outside diameter also equal to the inside diameter of filter receiving bore area 28. The cellulose filter may be of the type having pore sizes ranging from 0.22 to 0.45 micron, although other pore sizes may be used depending upon the applications for which the device is used.

Immediately on top of the filter is a second filter support screen 33 identical in structure and shape to support screen 31. Overlying the second or upper support screen 33 is a Teflon ring washer 34.

A metal lock screw 36 is formed with threads 38 which are mated for engagement with threads 29 of the bore. Lock screw 36 is formed with a central bore 40, through which air can travel, which has a diameter approximately the same bore diameter as the bore diameter of Teflon washer 30. The top of lock screw 36 is provided with a notch 41 for reception of a screwdriver and by which the lock screw can be inserted and removed from bore 40.

A lateral passageway 44 is formed in housing 20 opening into the main passageway between lock screw 36 and entry tube or shaft 15 of meter B. Passageway 44 is threaded to receive a valve or vent screw 45. The valve or vent screw is provided with a central passageway 48 coaxially aligned with the shaft of the screw and which terminates laterally of the screw through passageway 49. The lateral termination 49 is locked at a position within passageway 44 when the screw is fully inserted within the passageway and is arranged to project outwardly from the housing when the vent screw is partially removed from the housing. Vent screw 45 is provided with a wing nut 50 to allow the screw turned for insertion and removal by simple finger action. A resilient washer 52 is locked between the wing nut 50 and housing 20 on vent screw 45 for nesting against the housing to prevent any gas leak which might occur through the threads of the lock screw during the interval that the lock screw is fully inserted into passageway 44.

In operation, the required filter is installed by first inserting the Teflon washer 30 into the filter receiving bore area 28 then placing cellulose filter 32 surrounded on opposite sides by filter screens 31 and 33. The assembly is placed directly over Teflon washer 30. The Teflon washer 34 is then placed on the upper screen 33. Lock screw 36 is then threaded into relatively tight engagement with Teflon washer 34 using a screwdriver with the cutout or notch 41 of the locked screw.

The support screens 31 and 33 provide support for the relatively flimsy cellulose filter 32 and also function to block the passageway of larger matter. Meter B is then attached by screwing in the threaded shaft 15 into the neck of housing 20 into threads 29. Thence, vent screw 45 is fully threaded into passageway 44 to prevent air escape from the passageway. The device is then utilized by piercing a sample container with needle 22.

It is standard practice to form a more perfect seal to place a rubber seal as indicated at D in FIG. 1 around needle 22 in which the rubber seal tightly engages needle 22 and is provided with a lower flange 55 which engages the container and prevents gas entry or escape from around the exterior of the needle. In this condition, the needle extends into the sample container thus opening entrant bore 24 into the container to allow gas transfer between the sample container and meter B through filter assembly C. Cellulose filter 32 will retain contaminants and prevent contamination from passing from between the meter and the sample container. It can be seen that in applications where vacuum within a container is to be measured, that of necessity, gas must transfer from meter B to the container in order to effect an indication of negative pressure within the container. In such applications the filter assembly obstructs contaminating materials which normally exist within the meter assembly from passing into the sample container.

In many applications, it is desirable to release the vacuum in the sample container prior to withdrawing the test mechanism. This can be accomplished by turning wing nut 50 to cause withdrawal of vent screw 45 partially from passageway 44 and to the point where discharge passage 49 is free of passageway 49. Under these conditions, atmosphere can enter through passageway 49 and into central passageway 48 and thence through filter assembly C and into the test container. It can be seen that the vacuum release gas entry into the container is also filtered by filter assembly C, thus releasing the vacuum in the container under sterile conditions.

For reuse, lock screw 36 can be removed and a cellulose filter 32 installed to prevent accumulative contamination of the filter.

What is claimed is:
1. A vacuum-measuring assembly, comprising in combination a gas pressure gauge having an externally-threaded inlet fitting; a housing defining a hollow, elongated needle-shaped member having a pointed outer end for piercing a wall of an aseptically sealed container, said needle-shaped member having a bore of sufficient cross-section to allow for gas flow therethrough, said bore including a transverse entrant opening near said outer end and a duct extending axially therein from said transverse opening; said housing including a first elongated passageway having one end defining an inwardly-tapering frusto-conical segment extending into fluid communication with the duct of said needle-shaped member and the other end internally threaded and receiving the threaded inlet fitting of said gas pressure gauge, said passageway having an unthreaded portion extending between said one end and said other internally threaded end, said internally threaded end and unthreaded portion being of substantially greater cross-section than said bore; a filter means corresponding in cross-section to said unthreaded portion and slidably inserted into said internally threaded end and disposed within the unthreaded portion of said passageway; said filter means comprising a plurality of disc-shaped members, including an air pervious cellulose member, a pair of supporting air pervious screen members and a pair of annular-shaped Teflon washer members; an externally-threaded annular lock screw engaged along the threaded end of said passageway and biasing said filter means into compressed engagement within and with the unthreaded portion of said passageway; a second internally threaded passageway transverse to said first passageway, said second passageway providing fluid communication between the exterior of said housing and said first passageway, a valve means disposed in said second passageway, said valve means being formed of a screw threadably engaged with the internal threads of said second passageway, a gas passageway formed substantially axially in said screw and providing an opening extending from the inner end of said screw to the side thereof, said side opening being sealed by second said passageway wall when said screw is in a fully inserted position within said passageway and open to atmosphere when said screw is partially unthreaded from said second passageway, said valve means including a wing nut formed integral with said screw and a resilient washer disposed between said wing nut and said housing around said second passageway; and a compressible flange disposed around said needle-shaped member for engagement with the container to prevent gas passage from the container out around the exterior of the needle-shaped member, whereby when said filter means is disposed in compressed engagement, said pressure gauge threadably secured to said housing and said needle member inserted into said container, said gauge will provide an indication of the vacuum within said container without destroying the aseptic environment therein.

References Cited

UNITED STATES PATENTS

| | | | |
|---|---|---|---|
| 13,070 | 6/1855 | Phelps | 210—451 X |
| 1,096,885 | 5/1914 | Bacon | 251—351 X |
| 1,694,838 | 12/1928 | Beyha | 73—392 |
| 2,046,539 | 7/1936 | Willach | 73—392 X |
| 2,251,964 | 8/1941 | Stackhouse | 55—486 |
| 2,481,651 | 9/1949 | Fitzpatrick | 73—395 |
| 2,486,133 | 10/1949 | Egger | 73—395 |
| 2,553,763 | 5/1951 | Hammon | 55—502 |
| 2,565,560 | 8/1951 | Jacobsson | 50—10 |
| 2,718,665 | 9/1955 | Clade | 18—47 |
| 2,725,749 | 12/1955 | Green | 73—395 |
| 2,749,744 | 6/1956 | Doudera et al. | 73—408 X |
| 2,823,699 | 2/1958 | Willis | 251—351 X |
| 2,841,984 | 7/1958 | Green | 73—395 |
| 2,980,204 | 4/1961 | Jordan | 55—487 |

FOREIGN PATENTS 772,458 10/1934 France.

HARRY B. THORNTON, *Primary Examiner.*

D. E. TALBERT, Jr., *Assistant Examiner.*

U.S. Cl. X.R.

55—270, 274, 417, 478, 486, 502, 385, 511; 251—351; 210—446; 73—420